(12) United States Patent
Martorana et al.

(10) Patent No.: US 12,147,209 B2
(45) Date of Patent: Nov. 19, 2024

(54) MICROCONTROLLER UNIT AND CORRESPONDING METHOD OF OPERATION

(71) Applicants: STMicroelectronics S.r.l., Agrate Brianza (IT); STMicroelectronics Application GmbH, Aschheim-Dornach (DE)

(72) Inventors: Rosario Martorana, Catania (IT); Mose' Alessandro Pernice, Patyerno' (IT); Roberto Colombo, Munich (DE)

(73) Assignees: STMicroelectronics S.r.l., Agrate Brianza (IT); STMicroelectronics Application GmbH, Aschheim-Dornach (DE)

(*) Notice: Subject to any disclaimer, the term of this patent is extended or adjusted under 35 U.S.C. 154(b) by 433 days.

(21) Appl. No.: 17/704,675

(22) Filed: Mar. 25, 2022

(65) Prior Publication Data
US 2022/0308545 A1   Sep. 29, 2022

(30) Foreign Application Priority Data
Mar. 29, 2021 (IT) ........................ 102021000007703

(51) Int. Cl.
*G05B 19/042* (2006.01)
(52) U.S. Cl.
CPC ................ *G05B 19/0428* (2013.01); *G05B 2219/24015* (2013.01); *G05B 2219/25257* (2013.01)
(58) Field of Classification Search
CPC ...... G05B 19/0428; G05B 2219/24015; G05B 2219/25257; G06F 11/1004; G06F 9/22; G06F 9/30098
See application file for complete search history.

(56) References Cited

U.S. PATENT DOCUMENTS 6,317,857 B1 * 11/2001 Hornung ............. G06F 11/1004
711/5
8,332,722 B1   12/2012 Vera Rojas et al.
(Continued)

FOREIGN PATENT DOCUMENTS

WO   03032159 A2   4/2003

OTHER PUBLICATIONS

V. Gherman, S. Evain, M. Cartron, N. Seymour and Y. Bonhomme, "System-level hardware-based protection of memories against soft-errors," 2009 Design, Automation & Test in Europe Conference & Exhibition, Nice, France, 2009, pp. 1222-1225, (Year: 2009).*

(Continued)

*Primary Examiner* — Daniel F. McMahon
(74) *Attorney, Agent, or Firm* — Crowe & Dunlevy LLC

(57) ABSTRACT

A set of configuration memory locations store configuration data for a microcontroller unit. A hardware monitoring module is coupled by an interconnection bus to the configuration memory locations. The hardware monitoring module reads from an instruction memory a command including an address of a target memory location in the set of configuration memory locations. Data is read from the target memory location corresponding to the address read and a checksum value is computed as a function of the data that is read from the target memory location. The computed checksum value is then compared to a respective expected checksum value stored in a checksum storage unit. An alarm signal is triggered in response to a mismatch detected between the computed checksum value and the respective expected checksum value.

21 Claims, 2 Drawing Sheets

(56) References Cited

U.S. PATENT DOCUMENTS

| | | | |
|---|---|---|---|
| 2003/0097628 A1* | 5/2003 | Ngo | H03K 19/17764 714/736 |
| 2005/0071730 A1 | 3/2005 | Moyer et al. | |
| 2007/0101236 A1* | 5/2007 | Bauerle | G06F 11/1004 714/763 |
| 2009/0271536 A1* | 10/2009 | Tiennot | G06F 13/28 710/28 |
| 2012/0066551 A1* | 3/2012 | Palus | G06F 11/28 714/39 |
| 2013/0262964 A1* | 10/2013 | Winker | G06F 11/1004 714/807 |
| 2016/0117221 A1* | 4/2016 | Nair | G06F 11/108 714/764 |
| 2016/0147586 A1* | 5/2016 | Mayer | G06F 11/073 714/37 |
| 2017/0228174 A1* | 8/2017 | Schaff | G06F 3/0673 |
| 2018/0067800 A1* | 3/2018 | Gusev | G06F 11/1068 |
| 2022/0100601 A1* | 3/2022 | Baum | G06F 11/1608 |
| 2022/0101042 A1* | 3/2022 | Kaminitz | G06N 3/048 |
| 2022/0101043 A1* | 3/2022 | Katz | H03M 13/15 |

OTHER PUBLICATIONS

IT Search Report and Written Opinion for priority application, IT Appl. No. 102021000007703, report dated Dec. 1, 2021, 7 pages.

\* cited by examiner

MICROCONTROLLER UNIT AND CORRESPONDING METHOD OF OPERATION

PRIORITY CLAIM

This application claims the priority benefit of Italian Application for Patent No. 102021000007703, filed on Mar. 29, 2021, the content of which is hereby incorporated by reference in its entirety to the maximum extent allowable by law.

TECHNICAL FIELD

The description relates to processing circuits (e.g., microcontroller units) including functional safety features.

One or more embodiments may apply to microcontroller units adapted to the ISO 26262 functional safety standard, e.g., for use in the automotive sector.

BACKGROUND

Conventional automotive microcontroller units (MCU) usually include a high number (e.g., hundreds) of configuration registers that determine the behavior of the device. As a consequence of random failures (e.g., bit flip errors) the content of such registers may change during time. A change of one or more bits stored in the configuration registers may alter the functionality of some safety-critical logic; such an alteration in functionality might represent a hazard for the user of the device (e.g., a vehicle into which the faulty microcontroller unit is incorporated).

The ISO 26262 functional safety specification requires that the system operate to detect such changes (failures) within a period of time defined as the "Fault Time Tolerance Interval" (FTTI). In the automotive microcontroller units currently under development, the FTTI time can be as short as 1 ms.

A periodic check of the content of the safety relevant registers is conventionally done by a software procedure running in a central processing unit (CPU) of the microcontroller. Such a software detection procedure should have a limited impact on the performance of the microcontroller unit. However, such software detection procedure may not be able to meet the safety requirements where a high number of safety relevant registers is to be checked in a short detection time (FTTI time).

Therefore, there is a need in the art to provide improved microcontroller units including an alternative error detection mechanism.

SUMMARY

One or more embodiments contribute in providing improved microcontroller units including an error detection mechanism which does not rely on a software procedure run by a central processing unit (CPU).

One or more embodiments may relate to a microcontroller unit.

One or more embodiments relate to a corresponding method of checking integrity of configuration data of a microcontroller unit.

In one or more embodiments, a microcontroller unit may comprise a set of configuration memory locations accessible via an interconnection bus and configured to store configuration data for the microcontroller unit, and a hardware monitoring module configured to be coupled to the interconnection bus. The hardware monitoring module is configured to read from an instruction memory a command including an address of a target memory location in the set of configuration memory locations (for example, as specified by a start address and a plurality of consecutive memory accesses), read data from the target memory location corresponding to the address read from the instruction memory, compute a checksum value as a function of the data read from the target memory location, compare the computed checksum value to a respective expected checksum value stored into a checksum storage unit, and trigger an alarm signal in response to a mismatch detected between the computed checksum value and the respective expected checksum value.

One or more embodiments may thus facilitate checking the integrity of the configuration data of a microcontroller unit (e.g., data stored in one or more configuration registers of the microcontroller unit) without resorting to a software procedure, instead relying on a dedicated hardware monitoring module.

BRIEF DESCRIPTION OF THE DRAWINGS

One or more embodiments will now be described, by way of example only, with reference to the annexed figures, wherein.

DETAILED DESCRIPTION

Figure 1:
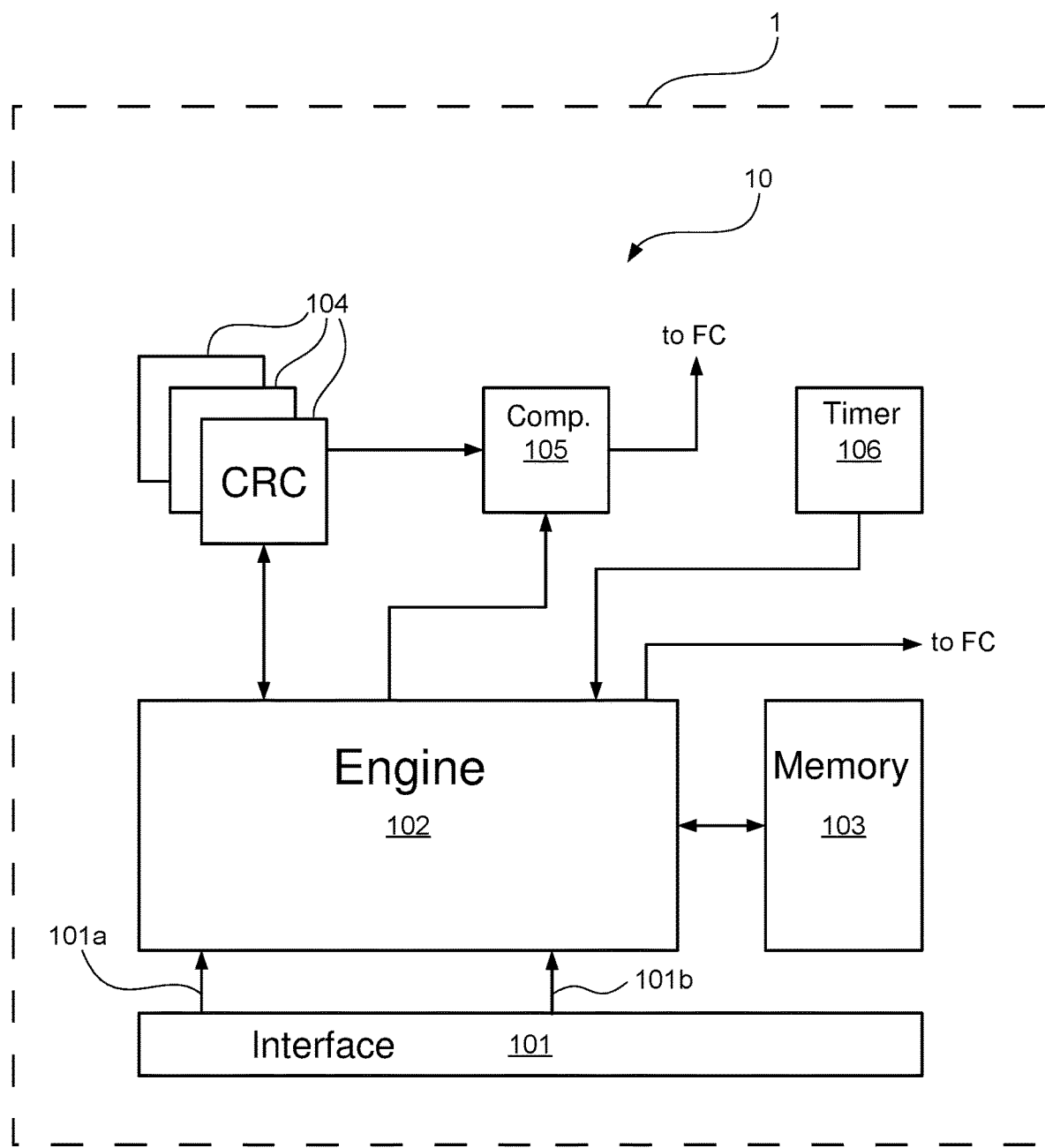
FIG. 1 is a circuit block diagram exemplary of a register monitor hardware module according to one or more embodiments of the present description.

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The headings/references used herein are provided merely for convenience and hence do not define the extent of protection or the scope of the embodiments.

Throughout the figures annexed herein, unless the context indicates otherwise, like parts or elements are indicated with like references/numerals and a corresponding description will not be repeated for brevity.

In a conventional automotive microcontroller unit, various hardware resources may be interconnected by means of an interconnection bus (e.g., a crossbar switch such as an AMBA communication bus). The interconnection bus may comprise master ports for connection to master devices (e.g., processing cores, hardware security modules, etc.) and slave ports for connection to slave devices (e.g., memories). One or more safety relevant configuration registers of the microcontroller unit may be coupled to the interconnection bus as slave devices.

One or more embodiments relate to a configurable hardware (HW) module for use in a microcontroller unit, which is configured to perform a check (e.g., scanning) of the safety relevant registers of the microcontroller unit as directed by the application (e.g., periodically). Such a register monitor hardware module may be comprised in the microcontroller unit and coupled to the interconnection bus as a master device, so that it can access the resources (e.g., the safety relevant registers) for carrying out an error detection procedure. Therefore, in one or more embodiments the register monitor module is a master of the microcontroller interconnection bus and is operable to autonomously start read transactions from the resources (e.g., IP blocks and/or memories) connected to the interconnection bus.

The register monitor module includes a set of registers for storing configuration data to configure the register monitor module itself.

The register monitor module can access a memory (e.g., a memory internal to the module itself or a memory shared with the SoC, such as a system RAM) that contains the addresses of the configuration memory locations that the user device is intended to periodically monitor for safety reasons. The target configuration memory locations to be monitored can be safety relevant registers and/or variables located in the memories. The register monitor module is configured to read (e.g., periodically, according to a time base programmed within a dedicated register) the values stored into the configuration memory locations, perform a corresponding cyclic redundancy check (CRC), and compare the calculated checksum to an expected checksum. In case of mismatch, the register monitor module triggers an event (e.g., an alarm signal).

Optionally, the comparison between the calculated checksum and the expected checksum can be done via software by a central processing unit (CPU) of the microcontroller unit. In this case, the register monitor module informs (e.g., notifies) the processing unit of the end of the CRC calculation by means of an interrupt. In case of mismatch between the calculated checksum and the expected checksum, the processing unit sends (e.g., asserts) a fault signal to a fault collector (FC) module of the microcontroller.

Therefore, one or more embodiments relate to a register monitor hardware module 10 as exemplified in the circuit block diagram of FIG. 1. The register monitor hardware module 10 comprises the following circuit blocks: an interconnection bus interface circuit 101; an address value loading engine 102 operatively coupled to the interface circuit 101 via an address channel 101a and a data channel 101b; a memory 103 (e.g., a RAM) operatively coupled to the engine 102; one or more hardware CRC computation modules 104 operatively coupled to the engine 102; a comparator circuit 105 operatively coupled to the engine 102 and to the hardware CRC computation modules 104; and a timer circuit 106 operatively coupled to the engine 102.

The interconnection bus interface circuit 101 provides a connection between the register monitor hardware module 10 and the interconnection bus of the microcontroller device 1. The register monitor module 10 may thus be coupled, via the interface circuit 101, as a master device to the interconnection bus and can read the values of the safety relevant registers and/or memory locations of the microcontroller unit which are coupled to the microcontroller interconnection bus.

The address value loading engine 102 is configured to load from the memory 103 the commands to execute a (periodic) check of a list of relevant configuration memory locations of the microcontroller unit. Optionally, the address value loading engine 102 may also include a set of configuration registers.

The memory 103 stores the list of commands to be executed for performing the check procedure, and/or stores the expected CRC checksum values.

Optionally, the register monitor hardware module 10 may not be provided with a memory 103, and the list of commands to be executed for performing the check procedure is stored in a system memory of the microcontroller unit (e.g., a system RAM). In such a case, the address value loading engine 102 is configured to load the commands from such a system memory.

Optionally, the expected CRC checksum values are stored in one or more registers of the hardware CRC computation modules 104 (e.g., in case the register monitor hardware module 10 is not provided with an internal memory 103).

The hardware CRC computation module 104 is configured to compute a conventional CRC algorithm. Optionally, the register monitor hardware module 10 comprises a plurality of CRC computation modules 104 to compute different CRC algorithms (e.g., for different modules registers or for a set of modules registers). Optionally, the CRC checksum values calculated by the CRC computation module(s) 104 are accessible by the software (e.g., running on a processing unit of the microcontroller unit), e.g., for performing a software check of the CRC checksum values.

The comparator circuit 105 is configured to compare the checksum values calculated by the CRC computation module(s) 104 to the expected checksum values (or signatures) stored in the memory 103 or in a register of the hardware CRC computation module 104. In case of a mismatch, the comparator circuit 105 triggers an event (e.g., asserts a fault signal) to a fault collector (FC) module.

Optionally, the register monitor hardware module 10 may not be provided with a comparator circuit 105, and the comparison between the calculated checksum values and the expected checksum values is performed via a software procedure running on a processing unit of the microcontroller unit.

The timer circuit 106 is configured to trigger the check procedure, e.g., periodically. The period of the timer circuit 106 is configurable by the user. For instance, the period of the check procedure is configurable to be equal to 1 ms, or less.

Figure 2:
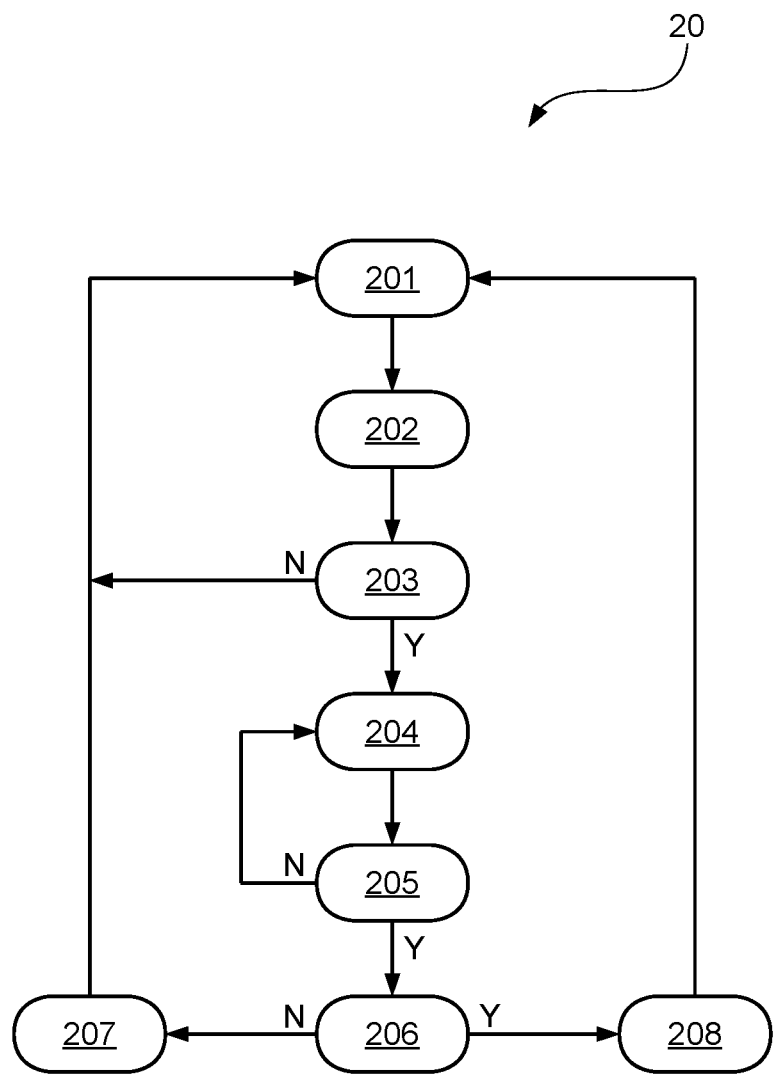
FIG. 2 is a flow diagram exemplary of operation of a register monitor hardware module according to one or more embodiments of the present description.

FIG. 2 is a block diagram exemplary of a finite state machine 20 implemented for operation of the register monitor hardware module 10. In particular, the finite state machine 20 is implemented by the engine 102.

As exemplified in FIG. 2, operation starts from an IDLE state 201. In the IDLE state 201, the register monitor module waits for the check procedure to be triggered (e.g., by the timer circuit 106). In response to a trigger event being detected, the state machine 20 advances to the next state 202, and the monitoring operations start.

In the state 202, the register monitor module initializes the CRC computation module(s) 104 with seeds and advances to the next state 203. In one or more embodiments, the user can select the seeds to be loaded in the CRC computation module(s) 104 for their configuration.

In the state 203, the register monitor module searches a START pattern in one or more locations (e.g., predefined locations) in the memory 103 (or, in some embodiments, in a system memory of the microcontroller). If a START pattern is found, the state machine advances to the next state 204 (outcome "Y" of state 203). If a START pattern is not found, the state machine returns to the IDLE state 201 (outcome "N" of state 203), waiting for the next trigger event, and an error is triggered to the fault collection unit.

In the state 204, the register monitor module accesses the memory 103 (or, in some embodiments, a system memory of the microcontroller) to fetch the first command or a next command for execution of the check procedure. A command may comprise the start address of the relevant register or memory location whose content is to be fed to the CRC computation module, the number of consecutive memory accesses (following that start address), the size of the memory accesses, the ID (identifier) of the CRC computation module to be used to calculate the CRC checksum value, and a flag to indicate whether the current command is the "last" command of the check procedure. Once the register monitor module reads a command from the memory 103 (or, in some embodiments, from a system memory of the microcontroller), it advances to the next state 205.

In the state 205, the register monitor module executes the command read in the state 204. To execute the command, the register monitor module reads in a loop all the locations in the target memory which are pointed at by the command and feeds the CRC computation module with the data read from those memory locations. Once executed, if the current command is the last command (as indicated by a corresponding flag value in the command itself), the state machine advances to the next state 206 (outcome "Y" of state 205). If the current command is not the last command, the state machine returns to the state 204 (outcome "N" of state 205) to execute a subsequent command.

In the state 206, the register monitor module verifies whether an expected CRC checksum value is available by checking an "HW CRC check" flag. In the register interface of the hardware CRC computation module 104, one configuration register may include the HW CRC check bit, which defines whether the CRC comparison has to be done in hardware (by comparing the checksum to an expected value) or it has to be done by a software, which simply reads out the calculated signature. In case the CRC comparison is done in hardware, the expected checksum is read from another configuration register, or is stored after the last command in the internal memory 103.

If an expected CRC checksum value is not available, the state machine advances to the next state 207 (outcome "N" of state 206). If an expected CRC checksum value is available, the state machine advances to the next state 208 (outcome "Y" of state 206). In one or more embodiments, the CRC checksums could also be pre-calculated in production. Whatever the checksum values are pre-calculated in production or calculated during the register configuration writing, the CRC checksum values can be calculated by setting the HW CRC check bit so as to direct the register monitor hardware module 10 to carry out a software CRC check. In this way, the calculated CRC values are exposed in a register. These values can then be stored in a software variable (e.g., in case of a software CRC check), or into the memory 103 after the last command or into a register of the hardware CRC computation module 104, (e.g., in case of a hardware CRC check). Finally, the hardware or software CRC check can be enabled again.

In the state 207, the register monitor module reads the checksum value computed by the CRC computation module and stores it as an expected CRC checksum value in the memory 103 (or, in some embodiments, in a register of the hardware CRC computation module 104), and sets a "Calculated CRC available" flag. After state 207, the state machine returns to the IDLE state 201.

In the state 208, the register monitor module (e.g., the comparator 105) compares the checksum value computed by the CRC computation module to the expected CRC checksum value (which is pre-calculated and stored in the memory 103 after the last command or, in some embodiments, in a register of the hardware CRC computation module 104), and asserts an error signal in case of mismatch. As previously discussed, such a comparison step may alternatively be performed by a processing unit of the microcontroller. After state 208, the state machine returns to the IDLE state 201.

Therefore, in one or more embodiments the register monitor module is configured by a user (e.g., a user device) to set a list of the safety relevant addresses using a set of commands, and/or to set the period of the comparison (i.e., the time interval elapsing between two subsequent executions of the check procedure).

The following Table shows an exemplary list of commands that the user may store to configure the behavior of the register monitor module 10.

| Source address (32 bits) | Number of transfers (10 bits) | Type of transfers (2 bits) | CRC instance (2 bits) | End of command (1 bit) |
| --- | --- | --- | --- | --- |
| addr_1 | 10 | 64 | 0 | No |
| addr_2 | 2 | 32 | 0 | No |
| addr_3 | 3 | 8 | 0 | No |
| addr_4 | 4 | 16 | 1 | Yes |

Each command may comprise a "source address" field (e.g., 32 bits), a "number of transfers" field (e.g., 10 bits), a "type of transfers" field (e.g., 2 bits), a "CRC instance" field (e.g., 2 bits), and an "end of command" field (e.g., 1 bit). The "source address" field may be 32 bits long and may include the start address from where the register monitor module is expected to read the content of the registers to be checked. The "number of transfers" field may be 10 bits long and may include the number of consecutive memory accesses that the register monitor module is expected to perform starting from the memory location having the address indicated in the "source address" field. The "type of transfers" field may be 2 bits long and may include the width (e.g., in bytes) of the read access. The "CRC instance" field may be 2 bits long and may indicate to which of the CRC computation modules the transfer has to be fed, in case the register monitor module is used to check different CRC algorithms. The "end of command" field may be 1 bit long and may indicate the end of a command.

In one or more embodiments, the user can start, stop or abort the operation of the register monitor module 10. For instance, the user may utilize a double static key to stop the current operation and force the state machine back to the IDLE state 201.

In one or more embodiments, in case a configuration register of the microcontroller unit has to be updated, the hardware CRC computation module 104 can be stopped. After the configuration register is updated, a new software CRC check operation can be started, at the end of which the software reads out the calculated CRC checksum and either stores it in a variable (in case the CRC check is done in SW) or writes it in the memory 103 or in a register of the hardware CRC computation module 104 (in case the CRC check is done in HW). Subsequently, the hardware CRC computation module 104 can be restarted.

Optionally, one or more embodiments may be configured to perform a boot time self test. For instance, once per power cycle, the software of a processing unit of the microcontroller unit may use the register monitor module 10 to calculate a known CRC value from a list of registers, and check its correctness.

Optionally, one or more embodiments may be configured to run a watchdog safety mechanism. For instance, if the register monitor module 10 fails to calculate the CRC checksum value within a timeout period (e.g., configurable), a failure signal is asserted to the fault collector module by the engine 102.

Optionally, one or more embodiments may be configured to run an access failure control mechanism. For instance, if the register monitor module 10 fails to access a target memory location (e.g., a target register), a failure signal is asserted to the fault collector module by the engine 102.

One or more embodiments may thus provide a solution for checking the correctness of data stored in safety relevant memory locations (e.g., configuration registers) in a microcontroller unit, without the need of resorting to a software procedure. One or more embodiments may thus provide one or more of the following advantages:
- no need of running a software in a processing unit of the microcontroller for carrying out the monitoring procedure,
- no need for a dedicated processing unit in the microcontroller for running the monitoring procedure,
- simple and small hardware implementation of the monitoring procedure, if compared to a CPU implementation,
- better performance in terms of timing if compared to a software implementation of the monitoring procedure,
- ease of configuration, insofar as the monitoring procedure is configured by configuring the register monitor hardware module, and
- flexibility of use, insofar as the user can customize which peripherals and registers are to be checked during the monitoring procedure.

As exemplified herein, a microcontroller unit (e.g., 1) comprises a set of configuration memory locations configured to store configuration data for the microcontroller unit, the configuration memory locations being accessible via an interconnection bus, and a hardware monitoring module (e.g., 10) configured to be coupled (e.g., 101) to the interconnection bus. The hardware monitoring module is configured to:
i) read (e.g., 204) from an instruction memory a command including an address of a target memory location in the set of configuration memory locations,
ii) read (e.g., 205) data from the target memory location corresponding to the address read from the instruction memory,
iii) compute (e.g., 205) a checksum value as a function of the data read from the target memory location,
iv) compare (e.g., 208) the computed checksum value to a respective expected checksum value stored into a checksum storage unit, and
v) trigger an alarm signal in response to a mismatch detected between the computed checksum value and the respective expected checksum value.

As exemplified herein, the hardware monitoring module comprises a checksum computation module (e.g., 104) configured to apply cyclic redundancy check processing to the data read from the target memory location to compute the checksum value.

As exemplified herein, the hardware monitoring module is configured to read data from a plurality of target memory locations, and the hardware monitoring module comprises a plurality of checksum computation modules configured to apply different cyclic redundancy check processing to the data read from the plurality of target memory locations to compute a plurality of different checksum values.

As exemplified herein, the hardware monitoring module comprises a timer circuit (e.g., 106) configured to periodically trigger execution of steps i) to v) by the hardware monitoring module, optionally with a configurable period (e.g., a period of 1 ms or less).

As exemplified herein, the hardware monitoring module is configured to check (e.g., 206) whether an expected checksum value is stored into the checksum storage unit and, in the negative case, to store (e.g., 207) the computed checksum value into the checksum storage unit as an expected checksum value.

As exemplified herein, the hardware monitoring module comprises a comparator circuit (e.g., 105) configured to compare the computed checksum value to the respective expected checksum value.

As exemplified herein, the microcontroller unit comprises a processing unit configured to run a software to compare the computed checksum value to the respective expected checksum value.

As exemplified herein, the instruction memory storing the commands is an internal memory (e.g., 103) of the hardware monitoring module.

As exemplified herein, the instruction memory storing the commands is a system memory of the microcontroller unit.

As exemplified herein, the checksum storage unit is an internal memory (e.g., 103) of the hardware monitoring module.

As exemplified herein, the checksum storage unit is a register of the checksum computation module.

As exemplified herein, the hardware monitoring module is coupled to the interconnection bus as a master device.

As exemplified herein, the hardware monitoring module is configured to measure a time elapsed for the computation of the checksum value, and to assert a failure signal in response to the elapsed time being higher than a timeout threshold value.

As exemplified herein, the hardware monitoring module is configured to check whether the target memory location corresponding to the address read from the instruction memory is successfully accessed, and to assert a failure signal in response to the hardware monitoring module failing to access the target memory location.

As exemplified herein, a method of checking integrity of configuration data of a microcontroller unit comprises:
i) reading from an instruction memory a command including an address of a target memory location in a set of configuration memory locations of the microcontroller unit, the set of configuration memory locations being configured to store configuration data for the microcontroller unit and being accessible via an interconnection bus,
ii) reading data from the target memory location corresponding to the address read from the instruction memory,
iii) computing, in a hardware monitoring module coupled to the interconnection bus, a checksum value as a function of the data read from the target memory location, iv) comparing the computed checksum value to a respective expected checksum value stored into the checksum storage unit, and v) triggering an alarm signal in response to a mismatch detected between the computed checksum value and the respective expected checksum value.

Without prejudice to the underlying principles, the details and embodiments may vary, even significantly, with respect to what has been described by way of example only, without departing from the extent of protection.

The claims are an integral part of the technical teaching provided herein in respect of the embodiments.

The extent of protection is determined by the annexed claims.

The invention claimed is:

1. A microcontroller unit, comprising:
   a set of configuration memory locations configured to store configuration data for the microcontroller unit, wherein the configuration memory locations are accessible via an interconnection bus; and
   a hardware monitoring module coupled to said interconnection bus;
   wherein the hardware monitoring module is configured to:
   i) read a command from an instruction memory, said command including a start address and a number of consecutive memory accesses for a target memory location in said set of configuration memory locations;
   ii) read data from the start address and number of consecutive memory accesses for said target memory location;
   iii) compute a checksum value as a function of said data that was read;
   iv) compare said computed checksum value to a respective expected checksum value stored in a checksum storage unit; and
   v) trigger an alarm signal in response to a mismatch detected between said computed checksum value and said respective expected checksum value.

2. The microcontroller unit of claim 1, wherein the hardware monitoring module further comprises a checksum computation module configured to apply cyclic redundancy check processing to said data that was read from said target memory location in order to compute said checksum value.

3. The microcontroller unit of claim 1, wherein the hardware monitoring module is configured to read data from a plurality of target memory locations, and wherein the hardware monitoring module comprises a plurality of checksum computation modules configured to apply different cyclic redundancy check processing to said data that was read from said plurality of target memory locations in order to compute a plurality of different checksum values.

4. The microcontroller unit of claim 1, further comprising a timer circuit configured to periodically trigger execution of steps i) to v) by the hardware monitoring module.

5. The microcontroller unit of claim 1, wherein the hardware monitoring module is further configured to check whether said checksum storage unit stores the expected checksum value and, when not stored, to store the computed checksum value into said checksum storage unit as said expected checksum value.

6. The microcontroller unit of claim 1, wherein the hardware monitoring module further comprises a comparator circuit configured to compare said computed checksum value to said respective expected checksum value.

7. The microcontroller unit of claim 1, further comprising a processing unit configured to execute software which compares said computed checksum value to said respective expected checksum value.

8. The microcontroller unit of claim 1, wherein said instruction memory is an internal memory of the hardware monitoring module.

9. The microcontroller unit of claim 1, wherein said instruction memory is a system memory of the microcontroller unit.

10. The microcontroller unit of claim 1, wherein said checksum storage unit is an internal memory of the hardware monitoring module.

11. The microcontroller unit of claim 1, wherein the hardware monitoring module further comprises a checksum computation module configured to apply cyclic redundancy check processing to said data that was read from said target memory location in order to compute said checksum value, and wherein said checksum storage unit is a register of said checksum computation module.

12. The microcontroller unit of claim 1, wherein the hardware monitoring module is coupled to said interconnection bus as a master device.

13. The microcontroller unit of claim 1, wherein the hardware monitoring module is configured to measure a time elapsed for the computation of said checksum value, and to assert a failure signal in response to said elapsed time being higher than a timeout threshold value.

14. The microcontroller unit of claim 1, wherein the hardware monitoring module is configured to check whether said target memory location corresponding to said start address and number of consecutive memory accesses read from the instruction memory is successfully accessed, and to assert a failure signal in response to said hardware monitoring module failing to access said target memory location.

15. A method of checking integrity of configuration data of a microcontroller unit that includes a set of configuration memory locations configured to store configuration data and a hardware monitoring module coupled to the configuration memory locations, the method comprising:
   i) reading a command from an instruction memory, said command including a start address and a number of consecutive memory accesses for a target memory location in said set of configuration memory locations;
   ii) reading data from the start address and number of consecutive memory accesses for said target memory location;
   iii) computing a checksum value as a function of said data that was read;
   iv) comparing said computed checksum value to a respective expected checksum value stored in a checksum storage unit; and
   v) triggering an alarm signal in response to a mismatch detected between said computed checksum value and said respective expected checksum value.

16. The method of claim 15, further comprising applying cyclic redundancy check processing to said data that was read from said target memory location in order to compute said checksum value.

17. The method of claim 15, wherein reading data comprises reading data from a plurality of target memory locations, and wherein computing the checksum value comprises applying different cyclic redundancy check processing to said data that was read from said plurality of target memory locations in order to compute a plurality of different checksum values.

18. The method of claim 15, further comprising periodically triggering execution of steps i) to v) in response to operation of a timer.

19. The method of claim 15, further comprising:
  checking whether said checksum storage unit stores the expected checksum value; and
  when not stored, storing the computed checksum value into said checksum storage unit as said expected checksum value.

20. The method of claim 15, further comprising measuring a time elapsed for the computation of said checksum value, and asserting a failure signal in response to said elapsed time being higher than a timeout threshold value.

21. The method of claim 15, further comprising checking whether said target memory location corresponding to said start address and number of consecutive memory accesses read from the instruction memory is successfully accessed, and asserting a failure signal in response to said hardware monitoring module failing to access said target memory location.

* * * * *